US006325738B1

(12) United States Patent
Caringella et al.

(10) Patent No.: US 6,325,738 B1
(45) Date of Patent: Dec. 4, 2001

(54) LIMITED SLIP DIFFERENTIAL

(75) Inventors: Anthony R. Caringella, Norridge; James A. Gruszkowski, Orland Park; Wesley P. Nowakowski, Arlington Heights, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/558,714

(22) Filed: Apr. 26, 2000

(51) Int. Cl.[7] .................................................. F16H 48/10
(52) U.S. Cl. ............................................ 475/249; 475/252
(58) Field of Search ..................................... 475/248, 249, 475/252

(56) References Cited

U.S. PATENT DOCUMENTS

| 2,696,125 | | 12/1954 | Saari . | |
|---|---|---|---|---|
| 3,292,456 | | 12/1966 | Saari . | |
| 3,406,593 | | 10/1968 | Vesey . | |
| 3,631,736 | | 1/1972 | Saari . | |
| 5,122,102 | * | 6/1992 | Chludek et al. | 475/252 |
| 5,320,587 | * | 6/1994 | Bodtker et al. | 475/230 |
| 5,441,461 | * | 8/1995 | Teraoka | 475/252 |
| 5,616,096 | * | 4/1997 | Hagiwara | 475/249 |
| 5,674,146 | * | 10/1997 | Hayakawa et al. | 475/249 X |

OTHER PUBLICATIONS

Rohregger, et al. "Advanced Development of Self–Controlled Torque Sensitive Limited–Slip Differential by Means of Helical Gears", SAE Technical Paper Series, 1994, pp. 934–941.
Warren, Andrew, "What's Limited Slip", Publication in PCA Editor's Digest & Dec. Spiel, 1 pg.
ITW Spiroid, "Concurve Gears and Gear Systems, Design Manual No. 1", 34 pgs.
ITW Spiroid, "Spiroid Gearing Design Manual No. 6", 54 pgs.

* cited by examiner

Primary Examiner—Charles A Marmor
Assistant Examiner—Ankur Parekh
(74) Attorney, Agent, or Firm—Donald J. Breh; Mark W. Croll; Lisa M. Soltis

(57) ABSTRACT

A limited slip differential having a carrier with a plurality of recesses disposed therein about a rotation axis thereof, each recess having an open side portion with generally opposite first and second edges substantially parallel to the rotation axis, a chamfer disposed along each of the first and second edges, and a planetary gear disposed in each of the plurality of carrier recesses having a portion protruding from the open side portion thereof.

22 Claims, 2 Drawing Sheets

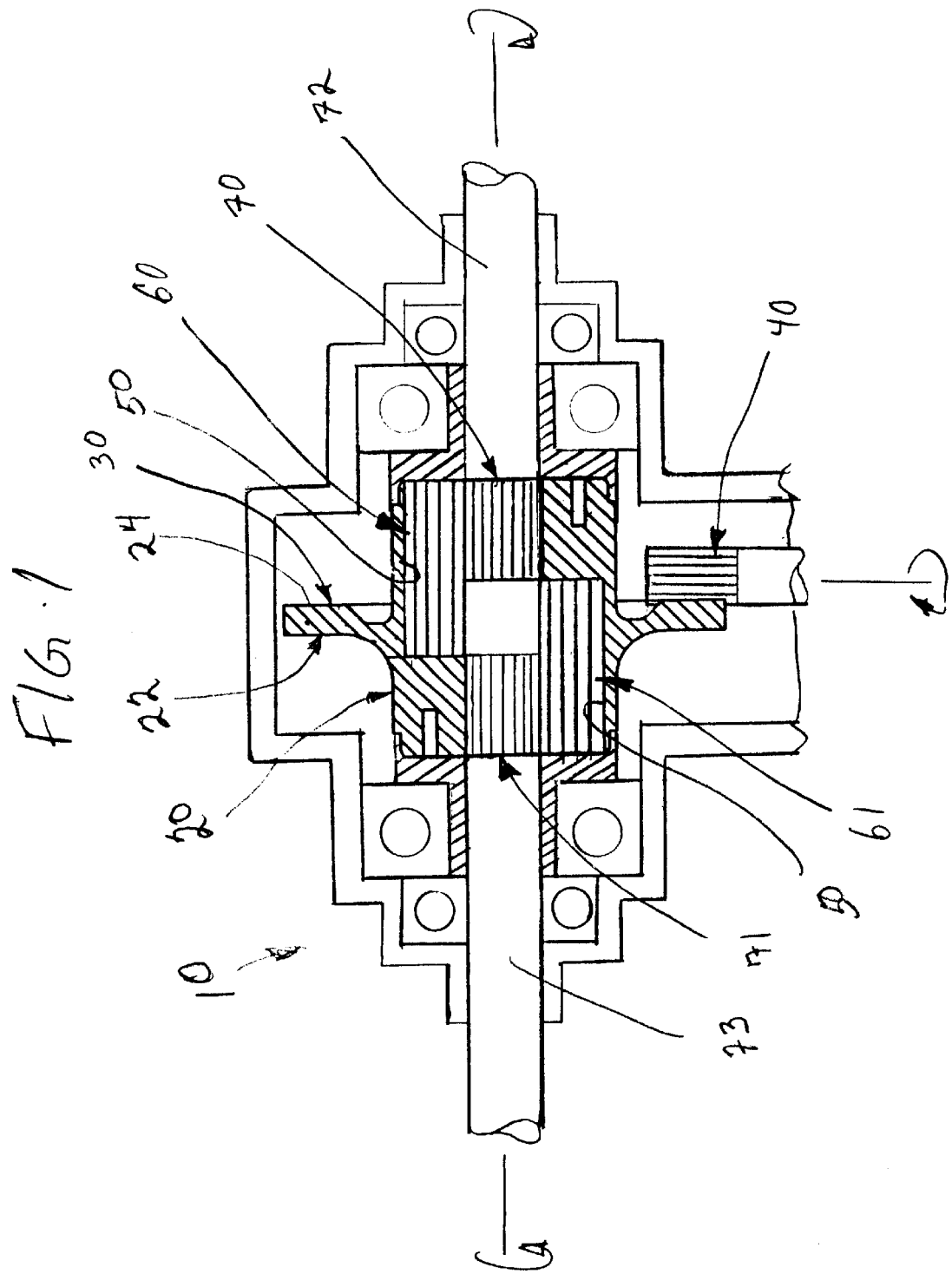

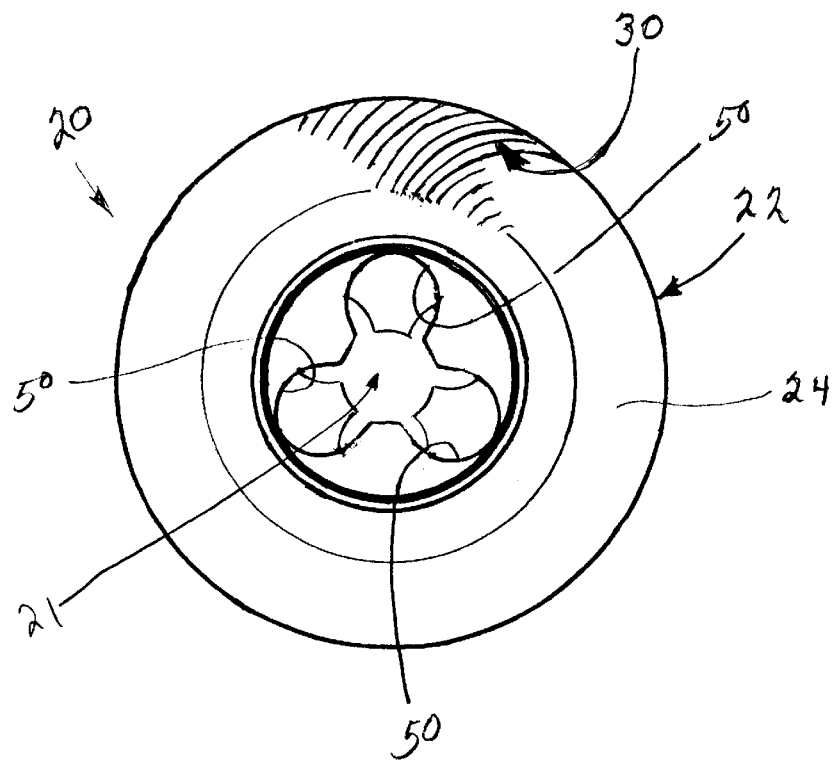
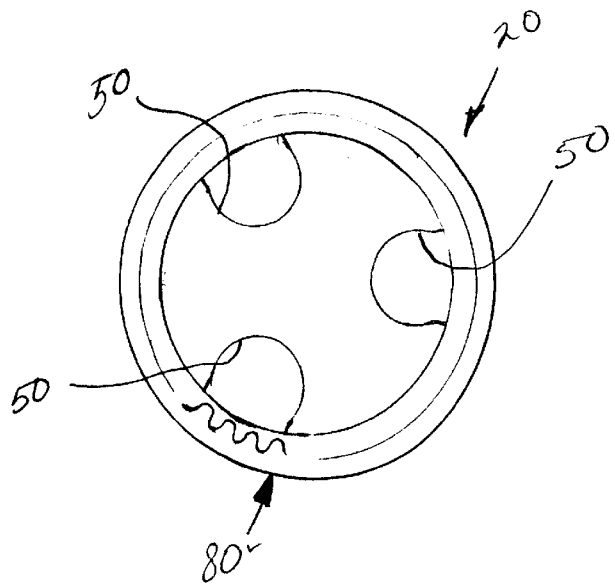
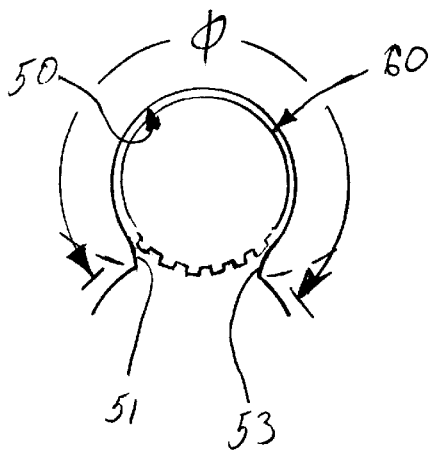

LIMITED SLIP DIFFERENTIAL

BACKGROUND OF THE INVENTION

The invention relates generally to differentials, and more particularly to limited slip differentials.

Limited slip differentials are known generally and employed commonly in rear wheel and center differentials, among many other applications.

U.S. Pat. No. 3,292,456 entitled "Spin Limiting Differential", assigned commonly herewith, for example, discloses a rotatable carrier having a plurality of open-sided bores with a corresponding plurality of planetary gears disposed symmetrically therein about a rotation axis of the carrier. A portion of each planetary gear protrudes from the open side of the corresponding bore and is coupled to a drive shaft, or axle. Friction between the planetary gears and the carrier bores limits the slip of the differential.

An object of the present invention is to provide novel limited slip differentials that improve upon and overcome problems in the art.

Another object of the invention is to provide novel limited slip differentials that are economical.

A further object of the invention is to provide novel limited slip differentials having improved reliability.

Still another object of the invention is to provide novel limited slip differentials that produce less noise.

Yet another object of the invention is to provide novel limited slip differentials having improved performance.

A more particular object of the invention is to provide novel limited slip differentials comprising a carrier having a plurality of recesses disposed therein about a rotation axis thereof, each recess having an open side portion with opposite first and second edges, a chamfer disposed in the recess along each of the first and second edges thereof, and a planetary gear disposed in each of the plurality of carrier recesses having a portion protruding from the open side portion thereof.

Another more particular object of the invention is to provide novel limited slip differentials comprising a carrier having a radial flange with a geared surface disposed about a rotation axis thereof the carrier having a first plurality of recesses disposed about the rotation axis on a first side thereof and a second plurality of recesses disposed about the rotation axis on an opposite side thereof, each recess having an open side portion with first and second edges substantially parallel to the rotation axis and a chamfer disposed thereon along each of the first and second edges, a planetary gear disposed in each of the plurality of recesses, portions of the planetary gears protruding from the open side portions of the first plurality of recesses engaged with a first gear, and portions of the planetary gears protruding from the open side portions of the second plurality of recesses engaged with a second gear, each planetary gear frictionally engageable with a circumferential portion of the corresponding recess, at least a portion of the chamfers on the recesses not contacting the corresponding planetary gear disposed therein.

Yet another more particular object of the invention is to provide novel limited slip differentials comprising a carrier having a radial flange disposed about a rotation axis thereof, the carrier having a first plurality of recesses disposed about the rotation axis on a first side thereof and a second plurality of recesses disposed about the rotation axis on a second opposite side thereof, each recess having an open side portion with first and second edges substantially parallel to the rotation axis, a planetary gear disposed in each of the plurality of recesses, portions of the planetary gears protruding from the open side portions of the first plurality of recesses engaged with a first gear, and portions of the planetary gears protruding from the open side portions of the second plurality of recesses engaged with a second gear, a skew axis geared surface having teeth with different pressure angles disposed on one of the first or second sides of the radial flange about the carrier rotation axis thereof.

These and other objects, aspects, features and advantages of the present invention will become more fully apparent upon careful consideration of the following Detailed Description of the Invention and the accompanying Drawings, which may be disproportionate for case of understanding, wherein like structure and steps are referenced generally by corresponding numerals and indicators.

BRIEF DESCRIPTION OF THE DRAWINGS

FIG. 1 is a limited slip differential according to an exemplary embodiment of the invention.

FIG. 2 is a first exemplary carrier configuration.

FIG. 3 is a second exemplary carrier configuration.

FIG. 4 is a partial detail view of a carrier recess.

DETAILED DESCRIPTION OF THE INVENTION

FIG. 1 illustrates a limited slip differential 10 generally comprising a carrier 20 having a radial flange 22 disposed about a rotation axis thereof The radial flange 22 generally comprises a skew axis geared surface thereon for engagement with a pinion coupled to an output of a motor or other rotary drive member.

In the exemplary embodiment of FIGS. 1 and 2, the skew axis geared surface is a gear face 30 disposed on a first side 24 of the radial flange 22 about the rotation axis. The exemplary pinion 40 and face gear 30 preferably comprise teeth having different pressure angles, for example HELI-CON or SPIROID gear forms by ITW Spiroid, Glenview, Ill.

In alternative embodiments, the pinion and geared surface of the carrier may have other known gear configurations, for example a bevel or worm gear form, or a HYPOID gear form.

The carrier also generally comprises a first plurality of open-sided recesses disposed symmetrically about the carrier rotation axis on a first side thereof, and a second plurality of open-sided recesses disposed symmetrically about the carrier rotation axis on an opposite second side thereof.

A planetary gear having a rotation axis parallel to the carrier rotation axis is disposed in each of the plurality of recesses on the first and second sides of the carrier. Portions of the planetary gears protruding from the open side portions of the first plurality of recesses are engaged with a first gear on the first side of the carrier, and portions of the planetary gears protruding from the open side portions of the second plurality of recesses are engaged with a second gear on the second side of the carrier.

In the exemplary embodiment of FIG. 2, the plurality of open-sided recesses 50 are configured on each of the first and second sides of the carrier 20 so that planetary gears disposed therein engage a centrally located sun gear, a portion of which may be rotatably disposed in a corresponding portion of an axial opening 21 through the carrier.

FIG. 1 illustrates portions of one of the planetary gears 60 and 61 on the first and second respective sides of the carrier 20 engaged with corresponding sun gears 70 and 71, which are formed on or are portions of corresponding axles 72 and 73 having rotation axes aligned with the carrier rotation axis.

The planetary gears may be spur gears having an involute profile or preferably a modified involute profile, or some other gear form.

In the exemplary embodiment of FIG. 3, which illustrates only a portion of the carrier 20 on one side thereof, the plurality of open-sided recesses 50 are configured on each of the first and second sides of the carrier so that planetary gears disposed therein engage a ring gear 80 having a rotation axis aligned with the carrier rotation axis. The ring gear 80 is disposed about the plurality of recesses 50, and portions of the planetary gears, not shown, protruding from the open side portions of the recesses engage the ring gear 80.

The engagement of planetary gears with central sun gears or with outer ring gears is known generally, as disclosed more fully in U.S. Pat. No. 3,292,456 entitled "Spin Limiting Differential", assigned commonly herewith and incorporated herein by reference.

The open-sided recesses 50 of the carrier, only one of which is illustrated in FIG. 4, each have generally opposite first and second edges on the open side thereof, substantially parallel to the carrier rotation axis. In each recess, along the first and second edges of the opening thereof, are disposed corresponding chamfers 51 and 53. A portion of the planetary gear 60 protrudes from the open side portion of the corresponding recess 50.

Each of the planetary gears is frictionally engageable with a circumferential portion of the corresponding recess, thus limiting the slip of the differential. In FIG. 4, at least a portion of the chamfers 51 and 53 of the recess does not contact the adjacent portions of the planetary gear 60 disposed therein, thus providing tapered lead-in portions along the first and second edges at the opening of the recess. The chamfers 51 and 53 preferably provide a relatively continuous transition between the portion of the recess that contacts the planetary gears and the portions of the recess that do not contact the planetary gears.

The circumferential portion of the recess that engages the corresponding planetary gear is selected so that the recess provides adequate support for the planetary gear rotating therein and at the same time does not bind the gear. Binding causes excessive wear and undesirable noise and vibration, and may be eliminated or substantially reduced by providing appropriately tapered lead-in portions with the chamfers, as discussed above.

In one differential application, the circumferential portion of the recess contactable with the planetary gear 60 has an angle $\phi$ between approximately 313 degrees and approximately 315 degrees. This range of angles however is only exemplary and maybe more or less depending on the requirements of the particular application.

The gears of the exemplary transaxle are preferably fabricated using powder metal technology.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A limited slip differential comprising:
   a carrier having a rotation axis,
   the carrier having a plurality of recesses disposed therein about the carrier rotation axis, each recess having an open side portion with generally opposite first and second edges;
   a chamfer disposed in the recess along each of the first and second edges thereof;
   a planetary gear disposed in each of the plurality of carrier recesses and having a portion protruding from the open side portion of the corresponding recess,
   each planetary gear frictionally engageable with a circumferential portion of the corresponding recess, at least a portion of the chamfers of each recess not contacting the corresponding planetary gear disposed therein,
   each chamfer providing a continuous transition between the circumferential portion of the corresponding recess engageable with the planetary gear and the portion of the chamfer not contacting the planetary gear.

2. The differential of claim 1, a sun gear having a rotation axis aligned with the carrier rotation axis, the plurality of planetary gears having a rotation axis parallel to the rotation axis of the sun gear, the portions of the planetary gears protruding from the open side portions of the recesses engaged with the sun gear.

3. The differential of claim 2, an axial opening in the carrier, the sun gear disposed at least partially in the axial opening, the open side portion of the plurality of recesses facing toward the sun gear, at least a portion of the chamfers on the plurality of recesses near the sun gear not contacting the corresponding planetary gear disposed therein.

4. The differential of claim 3, each planetary gear frictionally engageable with a circumferential portion of the corresponding recess, the circumferential portion of the recess between approximately 313 degrees and approximately 315 degrees.

5. The differential of claim 1, a ring gear having a rotation axis aligned with the carrier rotation axis, the plurality of planetary gears having a rotation axis parallel to the rotation axis of the ring gear, the ring gear disposed about the plurality of planetary gears, the portions of the planetary gears protruding from the open side portions of the recesses engaged with the ring gear.

6. The differential of claim 5, the open side portion of the plurality of recesses facing toward the ring gear, at least a portion of the chamfers on the plurality of recesses near the ring gear not contacting the corresponding planetary gear disposed therein.

7. The differential of claim 6, each planetary gear frictionally engageable with a circumferential portion of the corresponding recess, the circumferential portion of the recess between approximately 313 degrees and approximately 315 degrees.

8. The differential of claim 1, the circumferential portion of the recesses engageable with the corresponding planetary gears disposed therein between approximately 313 degrees and approximately 315 degrees.

9. The differential of claim 1, the carrier having a radial flange with a geared surface disposed thereon about the carrier rotation axis.

10. The differential of claim 9, the geared surface on a face of the radial flange.

11. A limited slip differential comprising:
    a carrier having a radial flange with a geared surface disposed about a rotation axis thereof, the carrier having a first plurality of recesses disposed symmetrically about its rotation axis on a first side thereof and a second plurality of recesses disposed symmetrically about its rotation axis on an opposite second side thereof, each recess having an open side portion with first and second edges substantially parallel to the rotation axis, a chamfer disposed along each of the first and second edges of each of the plurality of recesses;

a first gear on the first side of the carrier and a second gear on the second side thereof;

a planetary gear disposed in each of the plurality of recesses, the planetary gears each having a rotation axis parallel to the carrier rotation axis, portions of the planetary gears protruding from the open side portions of the first plurality of recesses engaged with the first gear, and portions of the planetary gears protruding from the open side portions of the second plurality of recesses engaged with the second gear, each planetary gear frictionally engageable with a circumferential portion of the corresponding recess, at least a portion of the chamfers on the plurality of recesses not contacting the corresponding planetary gear disposed therein, at least a portion of the chamfers towards the first and second edges of each recess not contacting the corresponding planetary gear disposed therein, each chamfer providing a continuous transition between the circumferential portion of the corresponding recess engageable with the planetary gear and the portion of the chamfer not contacting the planetary gear.

12. The differential of claim 11, the chamfers providing continuous transitions between the circumferential portions of the recesses engageable with the corresponding planetary gears and the portions thereof not engageable with the planetary gears.

13. The differential of claim 12, the circumferential portions of the recesses engageable with the corresponding planetary gears is between approximately 313 degrees and approximately 315 degrees.

14. A limited slip differential comprising:

a carrier having a radial flange disposed about a rotation axis thereof, the carrier having a first plurality of recesses disposed symmetrically about the rotation axis on a first side thereof and a second plurality of recesses disposed symmetrically about the rotation axis on an opposite second side thereof, each recess having an open side portion with first and second edges substantially parallel to the rotation axis;

a first gear on the first side of the carrier and a second gear on the second side thereof;

a planetary gear disposed in each of the plurality of recesses, the planetary gears each having a rotation axis parallel to the carrier rotation axis, portions of the planetary gears protruding from the open side portions of the first plurality of recesses engaged with the first gear and portions of the planetary gears protruding from the open side portions of the second plurality of recesses engaged with the second gear, the circumferential portions of the recesses engageable with the corresponding planetary gears between approximately 313 degrees and approximately 315 degrees, a skew axis geared surface disposed on one of the first and second sides of the radial flange about the carrier rotation axis, the skew axis geared surface having teeth with different pressure angles.

15. The differential of claim 14, a pinion having a conical helix engaged with the skew axis geared surface of the carrier.

16. The differential of claim 15, a pinion having a cylindrical helix engaged with the skew axis geared surface of the carrier.

17. The differential of claim 14, a chamfer disposed along each of the first and second edges of each recess.

18. The differential of claim 17, each planetary gear frictionally engageable with a circumferential portion of the corresponding recess, at least a portion of the chamfers on the plurality of recesses not contacting the corresponding planetary gear disposed therein, the chamfers providing continuous transitions between the circumferential portions of the recesses engageable with the planetary gears and the portions thereof that do not contact the planetary gears.

19. A limited slip differential comprising:

a carrier having a rotation axis, the carrier having a plurality of recesses disposed therein about the carrier rotation axis, each recess having an open side portion with generally opposite first and second edges;

a chamfer disposed in the recess along each of the first and second edges thereof;

a planetary gear disposed in each of the plurality of carrier recesses and having a portion protruding from the open side portion of the corresponding recess;

a ring gear having a rotation axis aligned with the carrier rotation axis, the plurality of planetary gears having a rotation axis parallel to the rotation axis of the ring gear, the ring gear disposed about the plurality of planetary gears, the portions of the planetary gears protruding from the open side portions of the recesses engaged with the ring gear.

20. The differential of claim 19, the open side portion of the plurality of recesses facing toward the ring gear, at least a portion of the chamfers on the plurality of recesses near the ring gear not contacting the corresponding planetary gear disposed therein.

21. The differential of claim 20, each planetary gear frictionally engageable with a circumferential portion of the corresponding recess, the circumferential portion of the recess between approximately 313 degrees and approximately 315 degrees.

22. A limited slip differential comprising:

a carrier having a rotation axis, the carrier having a plurality of recesses disposed therein about the carrier rotation axis, each recess having an open side portion with generally opposite first and second edges;

a chamfer disposed in the recess along each of the first and second edges thereof;

a planetary gear disposed in each of the plurality of carrier recesses and having a portion protruding from the open side portion of the corresponding recess, the circumferential portions of the recesses engageable with the corresponding planetary years between approximately 313 degrees and approximately 315 degrees.

* * * * *